(12) United States Patent
Katou et al.

(10) Patent No.: US 8,198,839 B2
(45) Date of Patent: Jun. 12, 2012

(54) ELECTRIC POWER TOOL

(75) Inventors: Kouji Katou, Tokyo (JP); Kazuya Takeuchi, Tokyo (JP); Ichiro Kusakari, Tokyo (JP); Osamu Itagaki, Tokyo (JP); Takahiro Nagaoka, Tokyo (JP)

(73) Assignee: Max Co., Ltd., Chuo-ku, Tokyo (JP)

( * ) Notice: Subject to any disclaimer, the term of this patent is extended or adjusted under 35 U.S.C. 154(b) by 840 days.

(21) Appl. No.: 12/296,011

(22) PCT Filed: Apr. 4, 2007

(86) PCT No.: PCT/JP2007/057581
§ 371 (c)(1),
(2), (4) Date: Oct. 3, 2008

(87) PCT Pub. No.: WO2007/116914
PCT Pub. Date: Oct. 18, 2007

(65) Prior Publication Data
US 2009/0160373 A1    Jun. 25, 2009

(30) Foreign Application Priority Data
Apr. 5, 2006  (JP) .................................. 2006-104591

(51) Int. Cl.
*B25F 5/00* (2006.01)
*H02P 6/08* (2006.01)
(52) U.S. Cl. .................................. 318/400.01; 388/937
(58) Field of Classification Search .......... 318/280–287, 318/119, 686, 17, 700, 400.01, 400.37; 388/937
See application file for complete search history.

(56) References Cited

U.S. PATENT DOCUMENTS
3,324,370 A * 6/1967 Studer ...................... 318/400.26
3,501,664 A * 3/1970 Veillette ................... 318/400.41
(Continued)

FOREIGN PATENT DOCUMENTS
JP          9-37585          2/1997
(Continued)

OTHER PUBLICATIONS

"http://www.electricmotors.machinedesign.com/guiEdits/Content/bdeee3/bdeee3_1.aspx", Jan. 2000.*
(Continued)

*Primary Examiner* — Bentsu Ro
(74) *Attorney, Agent, or Firm* — Drinker Biddle & Reath LLP

(57) ABSTRACT

An electric power tool "A" operates a working part 5 by repeating rotation of a motor 4 in a normal direction and in a reverse direction one or more times. The motor 4 includes a brushless motor. Sensors H for detecting a position of a rotor 15 are provided on the motor 4 so as to be advanced by an electrical angle of 30°±θ° from an intermediate position between respective stator teeth 16 in a direction of the normal rotation of the rotor 15. A control part 20 for controlling the rotation of the motor 4 controls a driving signal of the motor 4 based on the results of detection by the sensors H. Moreover, the control part 20 selects a detection signal of the sensors H so that relation between the rotor 15 and the detection signal of the sensors H is equivalent in either of the normal rotation and the reverse rotation of the rotor 15.

2 Claims, 10 Drawing Sheets

U.S. PATENT DOCUMENTS

| | | | |
|---|---|---|---|
| 4,217,508 A * | 8/1980 | Uzuka | 310/46 |
| 4,316,512 A * | 2/1982 | Kibblewhite et al. | 173/183 |
| 4,368,411 A * | 1/1983 | Kidd | 318/400.09 |
| 4,438,377 A * | 3/1984 | Sakai et al. | 318/400.09 |
| 4,454,458 A * | 6/1984 | Holland | 318/400.11 |
| 4,484,114 A * | 11/1984 | Ebbs | 318/400.1 |
| 4,510,422 A * | 4/1985 | Ogura | 318/400.1 |
| 4,541,029 A * | 9/1985 | Ohyama | 361/31 |
| 4,691,746 A * | 9/1987 | Sedgewick | 140/92.1 |
| 4,876,491 A * | 10/1989 | Squires et al. | 318/400.33 |
| 4,988,930 A * | 1/1991 | Oberheide | 318/82 |
| 5,767,639 A | 6/1998 | Sakaguchi et al. | |
| 5,983,473 A | 11/1999 | Yuguchi et al. | |
| 6,371,218 B1 * | 4/2002 | Amano et al. | 173/183 |
| 6,765,412 B1 * | 7/2004 | Schottler et al. | 326/83 |
| 7,111,835 B2 * | 9/2006 | Nagai et al. | 269/32 |
| 2002/0134811 A1 * | 9/2002 | Napier et al. | 227/131 |
| 2003/0072120 A1 | 4/2003 | Ishikawa et al. | |
| 2008/0190212 A1 * | 8/2008 | Sykes | 73/841 |

FOREIGN PATENT DOCUMENTS

| | | |
|---|---|---|
| JP | 9-156608 | 6/1997 |
| JP | 2570696 | 2/1998 |
| JP | 2001-186788 | 7/2001 |
| JP | 2003111264 A | 4/2003 |
| JP | 2003-267307 | 9/2003 |
| JP | 2004-23823 | 1/2004 |
| JP | 2005-335591 | 12/2005 |
| JP | 2006-27685 | 2/2006 |
| WO | WO 98/06167 | 2/1998 |
| WO | WO 2006/008968 A1 | 1/2006 |

OTHER PUBLICATIONS

Russian Office Action (with English-language translation) dated Apr. 20, 2011.

* cited by examiner

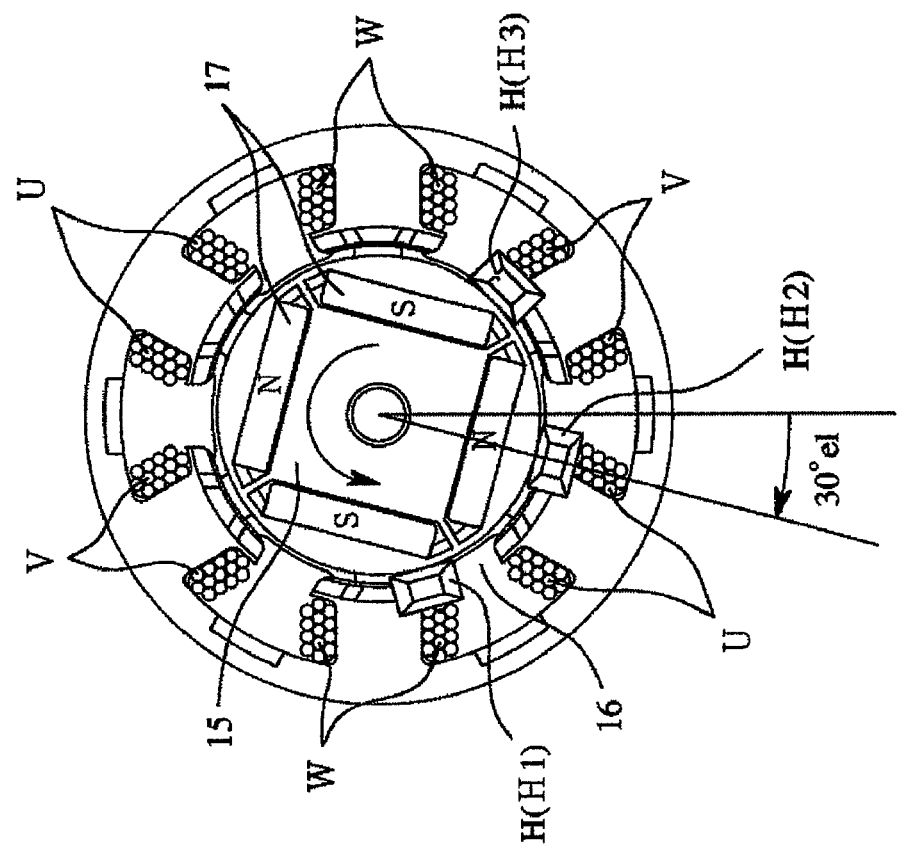
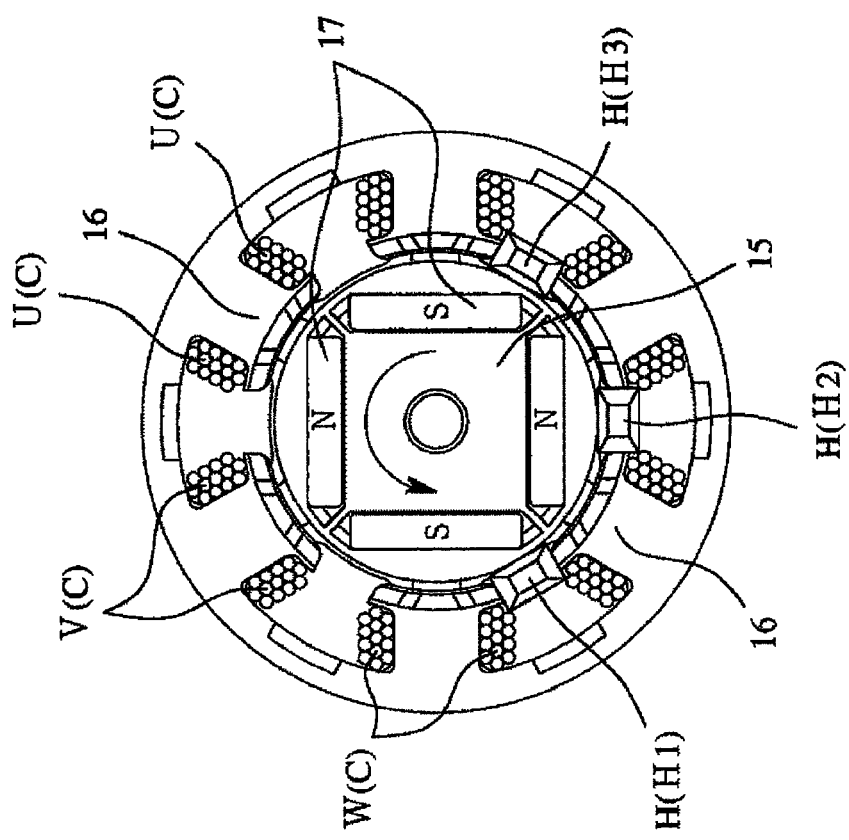

ELECTRIC POWER TOOL

TECHNICAL FIELD

The present invention relates to an electric power tool, and more particularly, to the electric power tool in which a working part is actuated by rotating a motor in normal and reverse directions and a brushless motor is used as the motor.

BACKGROUND ART

As an electric power tool in which a working part is actuated by rotating a motor in normal and reverse directions, there has been known a reinforcing bar binding machine for binding reinforcing bars with a wire (for example, JP-A-2003-267307). In this reinforcing bar binding machine, a brush motor has been generally used as a drive source. The reason why this brush motor is used is because high torque can be obtained in spite of a small size, and the machine can be downsized by using the brush motor.

In the conventional reinforcing bar binding machine as described above, position sensors are disposed at several positions in the working part as means for determining timing for switching the rotation of the brush motor between normal rotation, stopping and reverse rotation so that state of the working part can be recognized depending on whether or not the motor has passed the positions of the sensors. However, a number of the sensors are required for conducting the complicated switching operation of the rotation, and in order to obtain highly accurate positional information, a step for adjusting the positions of the sensors is required.

Moreover, in case of judging a position of the motor by monitoring time on the basis of a certain reference point, there is such a problem that a large error may occur in the judged position, because a motor speed varies according to a change of battery voltage.

Further, when abrupt acceleration and deceleration are repeated in a short period, there is such anxiety that the following problems may occur.

(1) On every time of the normal rotation or the reverse rotation of the motor, an intrusive electric current flows and a winding is heated. When polarity of the brush is switched during the rotation for rapidly reversing the rotation, sparks are generated, and the brush may be worn and need to be exchanged.

(2) Until life of the motor terminates, performances of the motor (rotation number, acceleration) are deteriorated, and hence, deterioration of performances of the machine is unavoidable.

(3) The machine cannot be used in an efficient state when the performances of the motor have been deteriorated, and power consumption is increased. In case of battery driving, a battery must be charged many times, because a working amount per one charge is lowered. As the results, useful life of the battery is decreased.

Still further, an angle of a rotor and timing for energizing the winding are physically determined due to a structure of the brush motor. For this reason, in case where the motor is set so as to efficiently work in the normal rotation, the motor will not work efficiently in the reverse rotation, generating large noises. Therefore, there has been such a problem that efficient operation cannot be expected in controlling the brush motor, when the normal rotation and the reverse rotation are mixed.

DISCLOSURE OF THE INVENTION

One or more embodiments of the invention provide an electric power tool capable of performing stabilized functions over an extended period of time and free from load of maintenance by using a brushless motor instead of a brush motor.

According to one or more embodiments of the invention, an electric power tool in which a working part is actuated by repeating rotation of a motor in a normal direction and in a reverse direction one or more times is provided with a sensor for detecting a position of a rotor of the motor, wherein either one or both of rotation number and rotation position of the motor is measured by a detection signal of the sensor, and a working state of the working part is recognized from results of the measurement.

According to the above described electric power tool, it is possible to judge the rotation number and the rotation position of the rotor from the detection signal of the sensor. Therefore, it becomes unnecessary to provide many position sensors for detecting working state of the working part, thus enabling the components to be reduced in number, and the positional information having high analyzing ability depending on the rotation number of the motor can be obtained. As the results, a step for adjusting the position sensors, confirmation of works, and so on can be eliminated, and working efficiency is enhanced. At the same time, troubles due to damage of the position sensors will not occur, and hence, it is possible to provide the electric power tool of enhanced quality.

The electric power tool may be provided with restricting means for restricting electric current for driving the motor, and the restricting means may control the electric current so that the electric current may be restricted to limited current values of at least two stages.

According to the above described electric power tool, it is possible to drive the motor with a large driving current in case where a large torque is required (when rapid acceleration is required, loaded torque is large), and with a small driving current in case where a small torque would be sufficient. As the results, consumption of the electric current can be depressed, and the motor can be restrained from being heated.

Moreover, the electric power tool may have at least three of the sensors, and the motor may include a brushless motor.

According to the above described electric power tool, by using the brushless motor instead of the brush motor, the brush itself which is a factor for a useful life of the motor can be eliminated, and hence, it is possible to remarkably prolong the life of the electric power tool.

The sensors may be disposed at positions advanced by an electrical angle of 30°±θ° from an intermediate position between respective stator teeth, a control part for controlling the rotation of the motor may control a driving signal for driving the motor based on detection result of the position of the rotor by the sensors, and the control part may select a detection signal of the sensors so that relation between the rotor and the detection signal of the sensors may be equivalent in either of the normal rotation and the reverse rotation of the rotor.

According to the above described electric power tool, by disposing the sensors at the positions displaced by an electrical angle of 30° in the reverse direction of the rotation from the intermediate position between the respective stator teeth, the timing for inputting the voltage can be detected in advance in either of the normal rotation and the reverse rotation. Therefore, it is possible to rotate the rotor in both the normal direction and reverse direction at an efficient advanced angle of the motor.

Further, the electric power tool may be provided with restricting means for restricting electric current for driving the motor, and the restricting means may control the electric current so that the electric current may be restricted to limited current values of at least two stages.

According to the above described electric power tool, efficient operation can be made in both the normal rotation and the reverse rotation. Because the electric current for the required torque can be made small, the limited value can be set to be low. Therefore, it is possible to further expect such advantages that consumption of the current is decreased, and the motor is restrained from being heated.

Other aspects and advantages of the invention will be apparent from the following description, the drawings and the claims.

BRIEF DESCRIPTION OF THE DRAWINGS

FIG. 3(a) is a view for explaining positions of sensors which are provided on a brushless motor.

FIG. 3(b) is a view for explaining the positions of the sensors which are provided on the brushless motor.

DESCRIPTION OF THE REFERENCE NUMERALS AND SIGNS

4 Motor
15 Rotor
16 Stator Tooth
20 Control part
21 Inverter
A Electric power tool
H Sensor

BEST MODE FOR CARRYING OUT THE INVENTION

Figure 1:
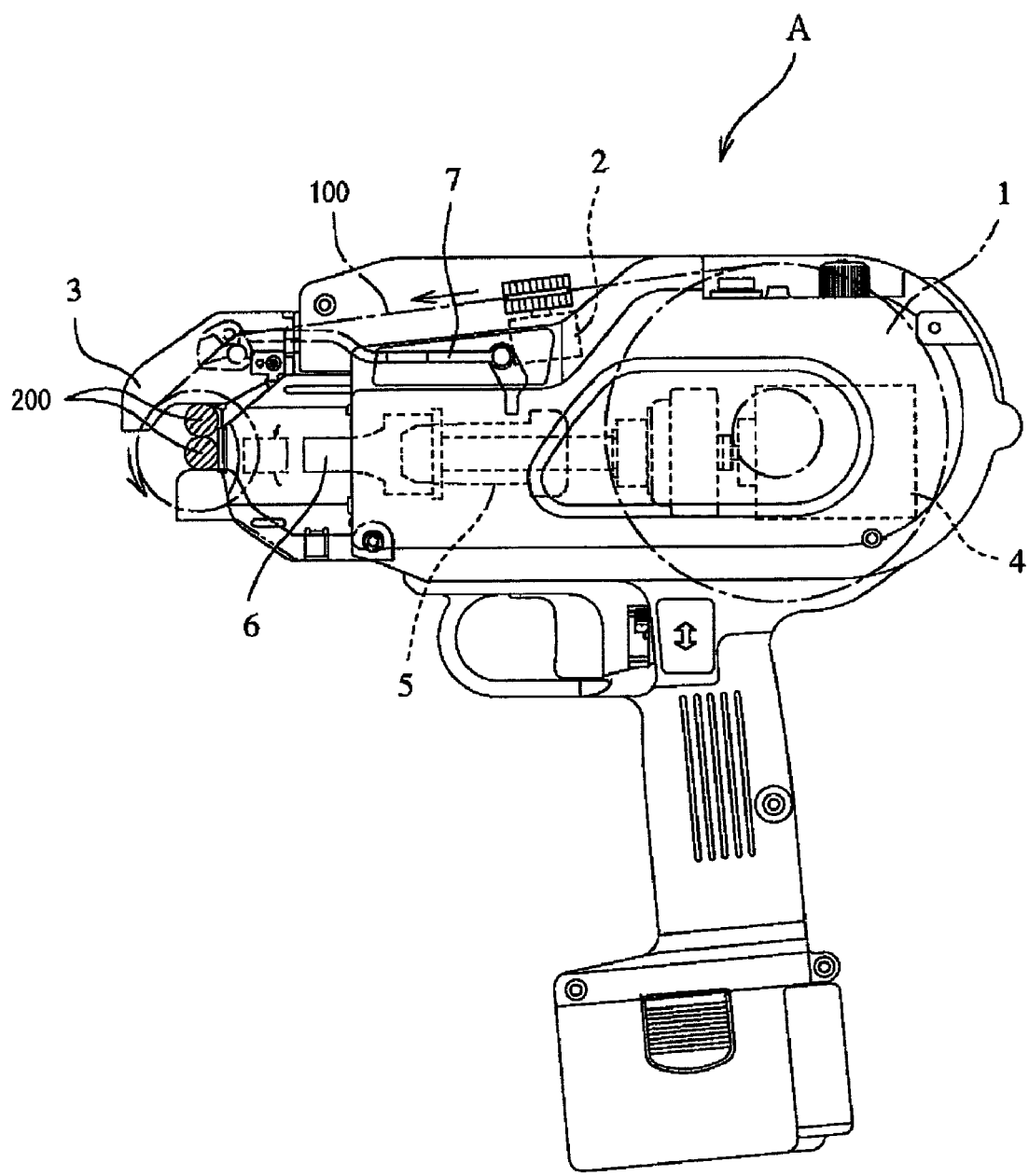
FIG. 1 is an explanatory view showing an electric power tool in a exemplary embodiment of the invention.

FIG. 1 shows an electric power tool "A" in an embodiment according to the invention. In the following description, a case where the invention is applied to a reinforcing bar binding machine for binding reinforcing bars will be described, as a exemplary embodiment of the invention. In this reinforcing bar binding machine "A", a wire 100 is fed from a cartridge 1 to a guide arm 3 by a feed motor 2. After the wire 100 has been wound around reinforcing bars 200, a twisting motor 4 is rotated to bind the reinforcing bars with the wire 100. The feed motor 2 is rotated in a normal direction thereby to wind the wire 100 around the reinforcing bars. Then, the twisting motor 4 is rotated in the normal direction to move a sleeve (a work part) 5 forward by sliding, and a hook 6 provided at a distal end of the sleeve 5 clamps the wire 100. Thereafter, the feed motor 2 is rotated in a reverse direction to remove slack of the wire 100. Then, the twisting motor 4 is rotated again in the normal direction to move the sleeve 5 forward, and a cutter 7 linked with this sleeve 5 is operated to cut the wire 100.

In this state, the hook 6 clamps a part of the wire 100 which has been wound around the reinforcing bars 200. When the twisting motor 4 is further rotated in the normal direction to move the sleeve 5 forward, the sleeve 5 is disengaged from a detent (not shown) which restricts rotation of the sleeve 5, and the sleeve 5 starts to rotate. Then, the hook 6 provided at the distal end of the sleeve 5 is also rotated integrally with the sleeve 5, and twists the wire 100 which is clamped, thereby to bind the reinforcing bars 200. After the reinforcing bars 200 have been bound, the twisting motor 4 is rotated in the reverse direction to release the wire 100 which has been clamped by the hook 6, and the sleeve 5 is returned to an original point.

Figure 2A:
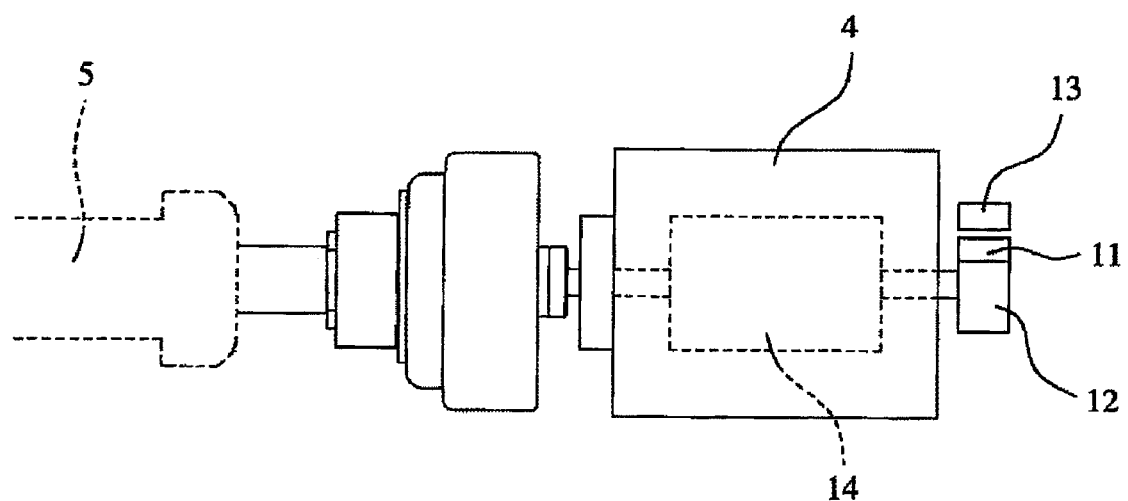
FIG. 2(a) is a front view for explaining relation between a brush motor and a sensor.
Figure 2B:
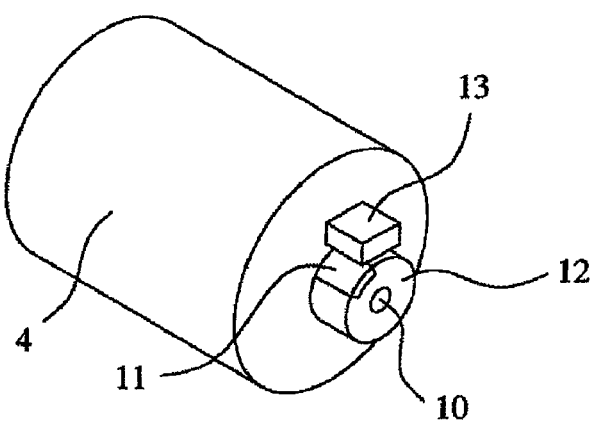
FIG. 2(b) is a perspective view as seen from a side face for explaining relation between the brush motor and the sensor.

In the reinforcing bar binding machine in the exemplary embodiment of the invention, a magnet unit 12 in a substantially disc-like shape which is provided with a sensor magnet 11 in a part of a peripheral face thereof is attached to a rotation shaft 10 of the motor 4, as shown in FIG. 2. A detecting sensor 13 such as a Hall sensor, a search coil responsive to the sensor magnet 11 is provided near the magnet unit 12. In case where the detecting sensor 13 is the Hall sensor, rotation number of a rotor 14 can be detected from a cycle of changes in a magnetic flux, and a position of the rotor 14 can be detected from electric voltage. In case where the detecting sensor 13 is the search coil, the rotation number of the rotor can be detected as an analogue value from inductive voltage, and state of the sleeve 5 can be recognized from the rotation position and rotation number of the rotor 14. In this manner, it is possible to judge the position of the sleeve 5 without using a position detecting sensor. For example, concerning the feed of the sleeve 5, it is possible to recognize at what position the sleeve 5 is, after a certain number of the normal rotations of the rotor.

In case where the state of the machine is recognized from working time, the state of the machine is unable to be accurately recognized, because the motor speed varies as the voltage varies. However, it is possible to recognize the state of the machine irrespective of the speed, by recognizing it from an amount of the rotation.

Generally, a brush motor has been used as the twisting motor 4, because a small size and high torque are required in the twisting motor. However, there have been various problems with the brush motor, as described above in the problems of the prior art. For this reason, in the exemplary embodiment of the invention, a brushless motor (for example, a brushless motor having six slots and four poles) is used as this twisting motor 4 instead of the brush motor.

In this twisting motor 4, a position of a rotor 15 is detected by three sensors H. According to a result of the detection, electric current is flowed to windings C of the stator, and the rotor 15 is rotated by attraction and repulsion between magnetic fields generated in stator teeth 16 and electromagnetic forces of permanent magnets 17 of the rotor 15. In case where the Hall sensors H (H1, H2, and H3) for detecting the position of the rotor 15 are arranged at an intermediate position (at an advanced angle of 0 degree) between the two stator teeth 16, as shown in FIG. 3(a), the same performance is obtained in both the normal rotation and the reverse rotation. However, it is necessary to input the voltage earlier, considering retarding time of the electric current by inductance of the windings with respect to a timing when the electric current for generating the largest torque flows. For this reason, in case of the rotor 15 having the permanent magnets 17 embedded, it is necessary to flow the current to the stator windings C further earlier than the above timing in the rotation direction, for the purpose of effectively using reluctance torque. Therefore, in this invention, in order to detect the timing of inputting the voltage earlier, the sensors H for detecting the position of the rotor 15 are arranged at positions displaced by an electrical angle of 30°, in a direction of the reverse rotation, from the intermediate position between the two stator teeth 16, as shown in FIG. 3(b). In this manner, the rotor can be rotated with high torque during the normal rotation. However, during the reverse rotation, the position of the rotor 15 is delayed with respect to the sensors H by an electric angle of 30° el, and hence, the rotor is unable to be rotated with the high torque, in case where the current flowing to the stator windings C is controlled relative to the sensors with the same logic as at the time of the normal rotation. However, in the present invention, detection signals of the sensors H are selected so that the position of the rotor 15 can be detected in the same manner, in either of the normal rotation and the reverse rotation of the rotor 15.

Figure 4:
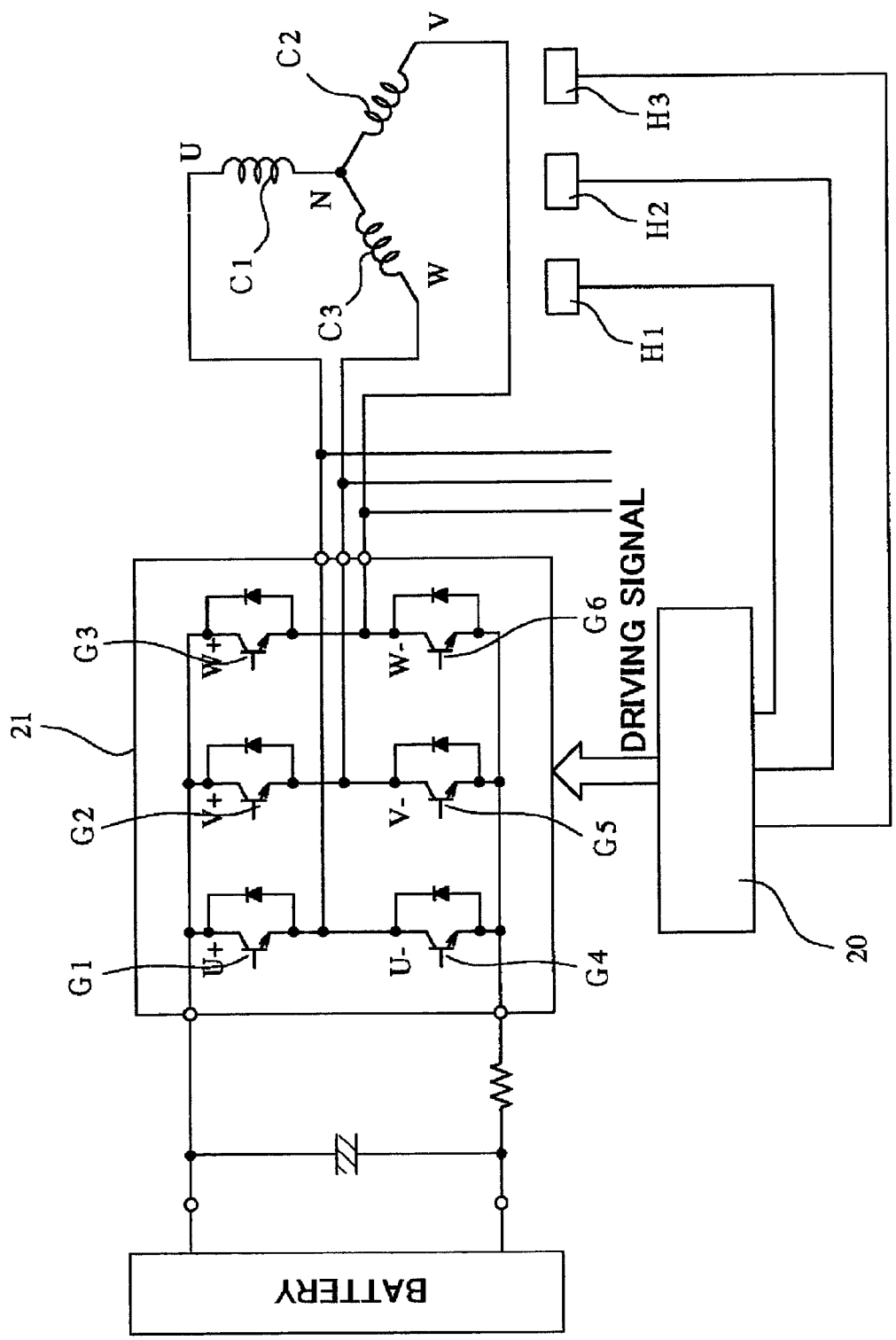
FIG. 4 is a block diagram for explaining drive of the brushless motor.

FIG. 4 is a block diagram for describing electrical control of the twisting motor 4. The position of the rotor 15 is detected by the Hall sensors H1 to H3. A control part 20 outputs driving signals to an inverter 21 on the basis of results of the detection by the Hall sensors H1 to H3, to flow driving currents to the stator windings C (C1 to C3) having a U-phase, V-phase, and W-phase. Attraction and repulsion between the generated magnetic fields and the permanent magnets 17 of the rotor 15 are repeated, thereby to rotate the rotor 15.

Figure 5A:
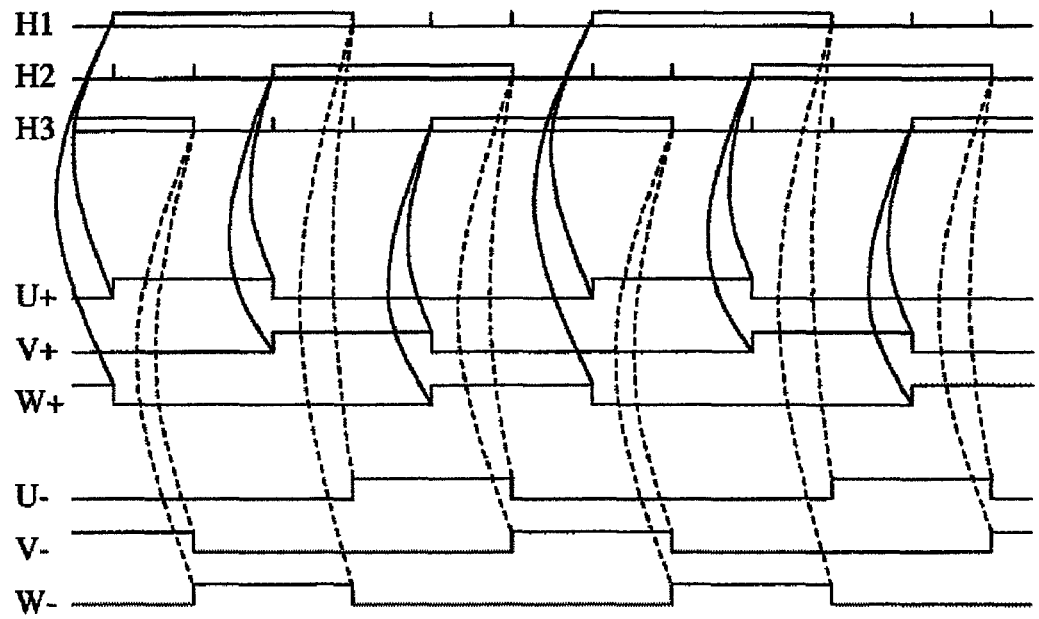
FIG. 5(a) is a time chart for explaining relation between the sensors and driving signals of an inverter during normal rotation of the brushless motor.
Figure 5B:
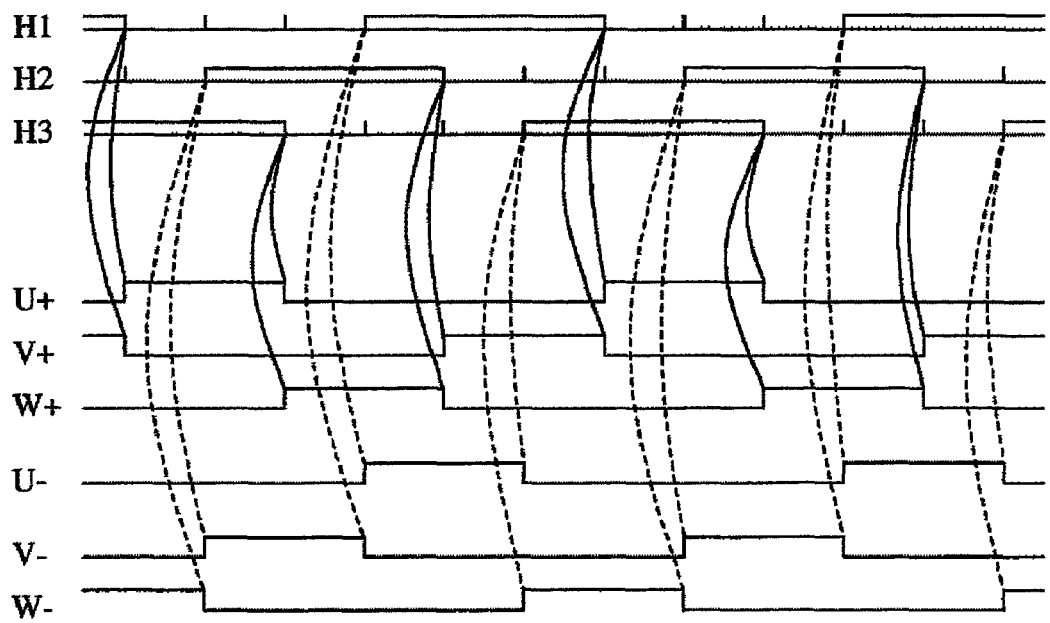
FIG. 5(b) is a time chart for explaining relation between the sensors and the driving signals of the inverter during reverse rotation of the brushless motor.

When the rotor 15 is rotated in the normal direction, the control part 20 controls the inverter 21 so that the driving current may flow to the stator windings C1 to C3, by sequentially turning on gates G1 to G3 of upper arms (U+, V+, W+) of the inverter 21, while the sensors H1, H2, H3 are on, and by sequentially turning on gates G4 to G6 of lower arms (U-, V-, W-) of the inverter 21, while the sensors H1, H2, H3 are off, as shown in FIG. 5(a). On the other hand, when the rotor 15 is rotated in the reverse direction, the control part 20 controls the inverter 21 so that the driving current may flow to the stator windings C1 to C3, by sequentially turning on the gates G1 to G3 of the upper arms (U+, V+, W+) of the inverter 21, while the sensors H1, H2, H3 are off, and by sequentially turning on the gates G4 to G6 of the lower arms (U-, V-, W-) of the inverter 21, while the sensors H1, H2, H3 are on, as shown in FIG. 5(b). In this manner, the rotation direction of the rotor 15 is controlled.

Figure 6:
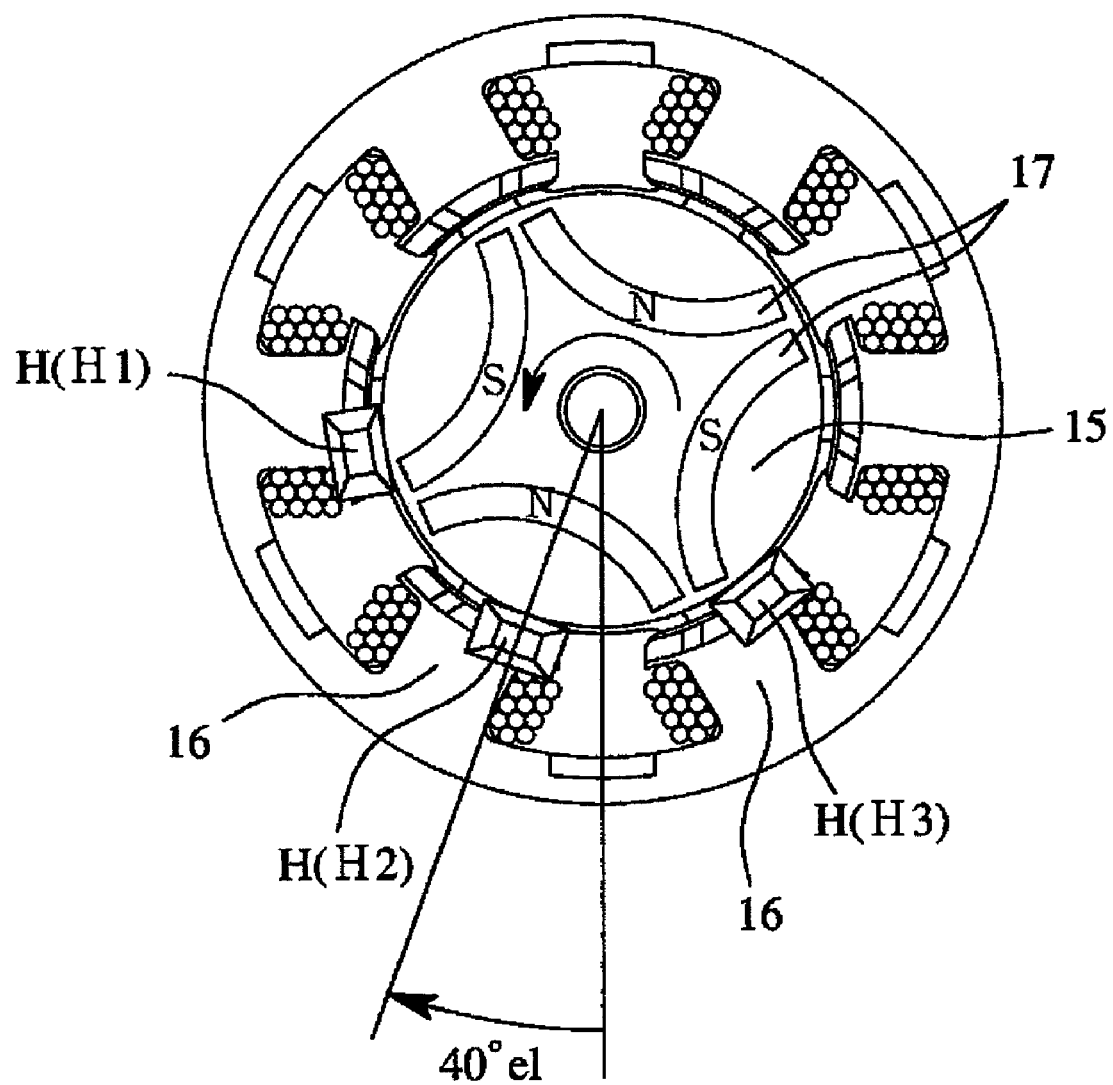
FIG. 6 is an explanatory view of a brushless motor in another embodiment.

In case where the permanent magnets 17 which are arranged on the rotor 15 are curved in a shape of arc as shown in FIG. 6, the reluctance torque is strongly exerted. Therefore, an input of the voltage which is made earlier at the electric angle of about 40° el would be most efficient in some cases. It is considered that in case where the sensors are arranged putting preference on either of the normal rotation and the reverse rotation depending on proportion between the normal rotation and the reverse rotation of the machine, the input can be decreased in total. Therefore, in case of putting preference on the normal rotation, the sensors may be so arranged as to be advanced, for example, by the electrical angle of 40° with respect to the normal rotation, and so arranged as to be advanced by the electrical angle of 20° during the reverse rotation, in driving the motor.

The control part 20 recognizes the rotation number of the motor, by counting the detection signals of the sensors H for detecting the position of the rotor 15. Therefore, in the same manner as in case of using the brush motor as described above, the position of the sleeve 5 can be recognized without using the position detecting sensor. In short, concerting the feed of the sleeve 5, it is possible to recognize at what position the sleeve 5 is, after a certain number of the normal rotations of the sleeve 5.

Figure 7:
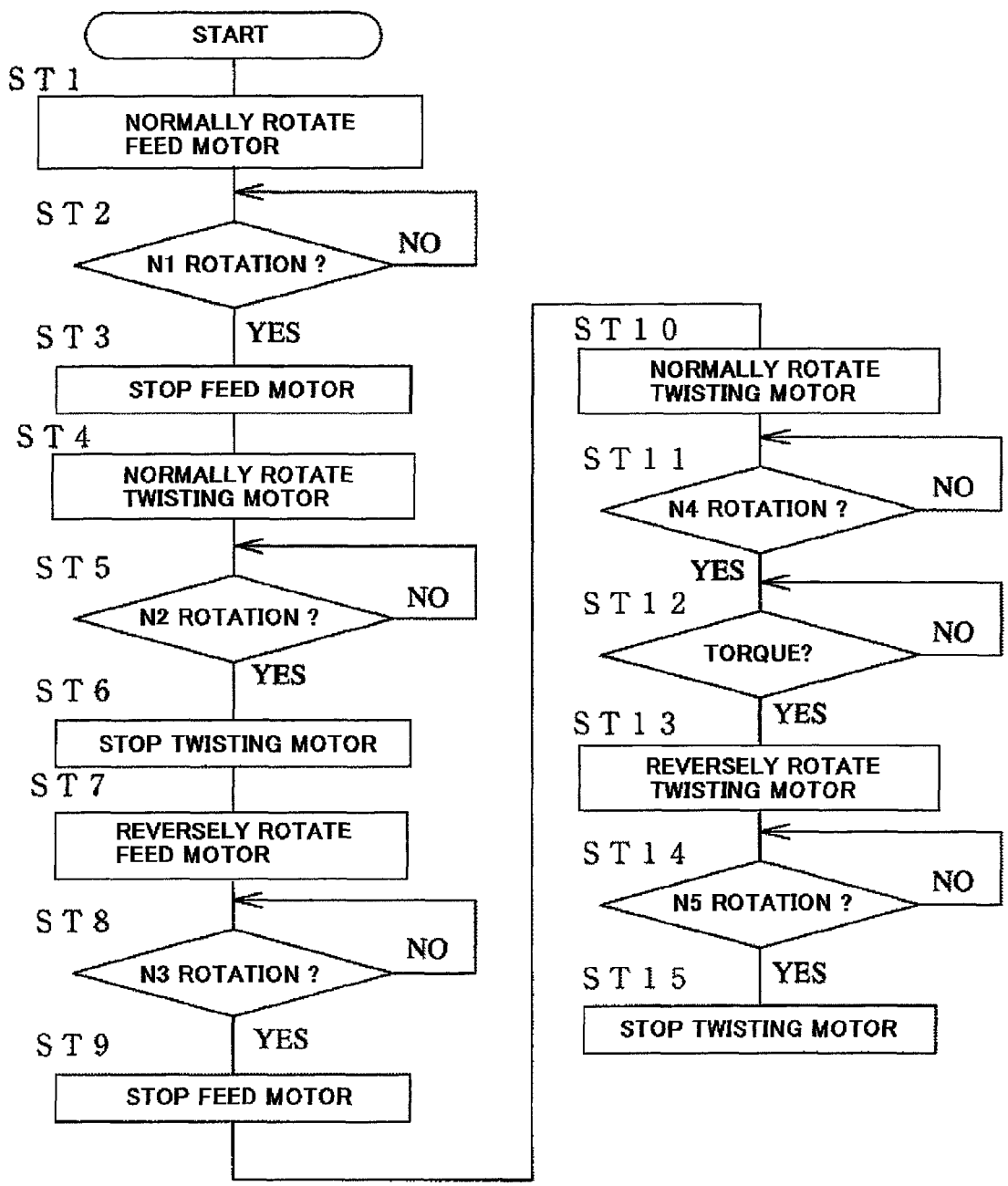
FIG. 7 is a flow chart for controlling a sequence of operations of a reinforcing bar binding machine by rotation number of the motor.

For example, explaining referring to the flow chart in FIG. 7, the feed motor is rotated to feed the wire (Step ST1), when the feed motor has finished an N1 rotation (Step ST2), it is judged that the wire has been wound around the reinforcing bars, and the feed motor is stopped in Step ST3. Then, the twisting motor is rotated in the normal direction to move the sleeve forward (Step ST4), when the twisting motor has finished an N2 rotation, it is judged that the hook has moved to the position for clamping the wire (Step ST5), and the twisting motor is stopped in Step ST6. Thereafter, the feed motor is rotated in the reverse direction (Step ST7), and when the feed motor has finished an N3 rotation, it is judged that slack of the wire has been removed (Step ST8). The rotation of the feed motor is stopped in Step ST9, and the twisting motor is rotated again in the normal direction (Step ST10).

When the twisting motor has finished an N4 rotation (Step ST11), it is judged that the sleeve has moved forward up to the position where the wire cutter can work and the wire has been cut. When load of torque has reached a determined value in Step ST12, it is judged that the reinforcing bars have been bound. In step ST13, the hook is released from the wire, and at the same time, the twisting motor is rotated in the reverse direction to return the sleeve to the original point. When the twisting motor has finished an N5 rotation, it is judged that the sleeve has returned to the original point (Step ST14), and the twisting motor is stopped in Step ST15, thereby to finish a sequence of the binding works.

In case where the wire has failed to bind the reinforcing bars and has come into a state entangled with the hook, the power must be turned off, and the hook must be rotated by hand to remove the wire. In this case, the trouble can be also dealt with, in the same manner as the above described control of the operation of the motor.

Figure 8:
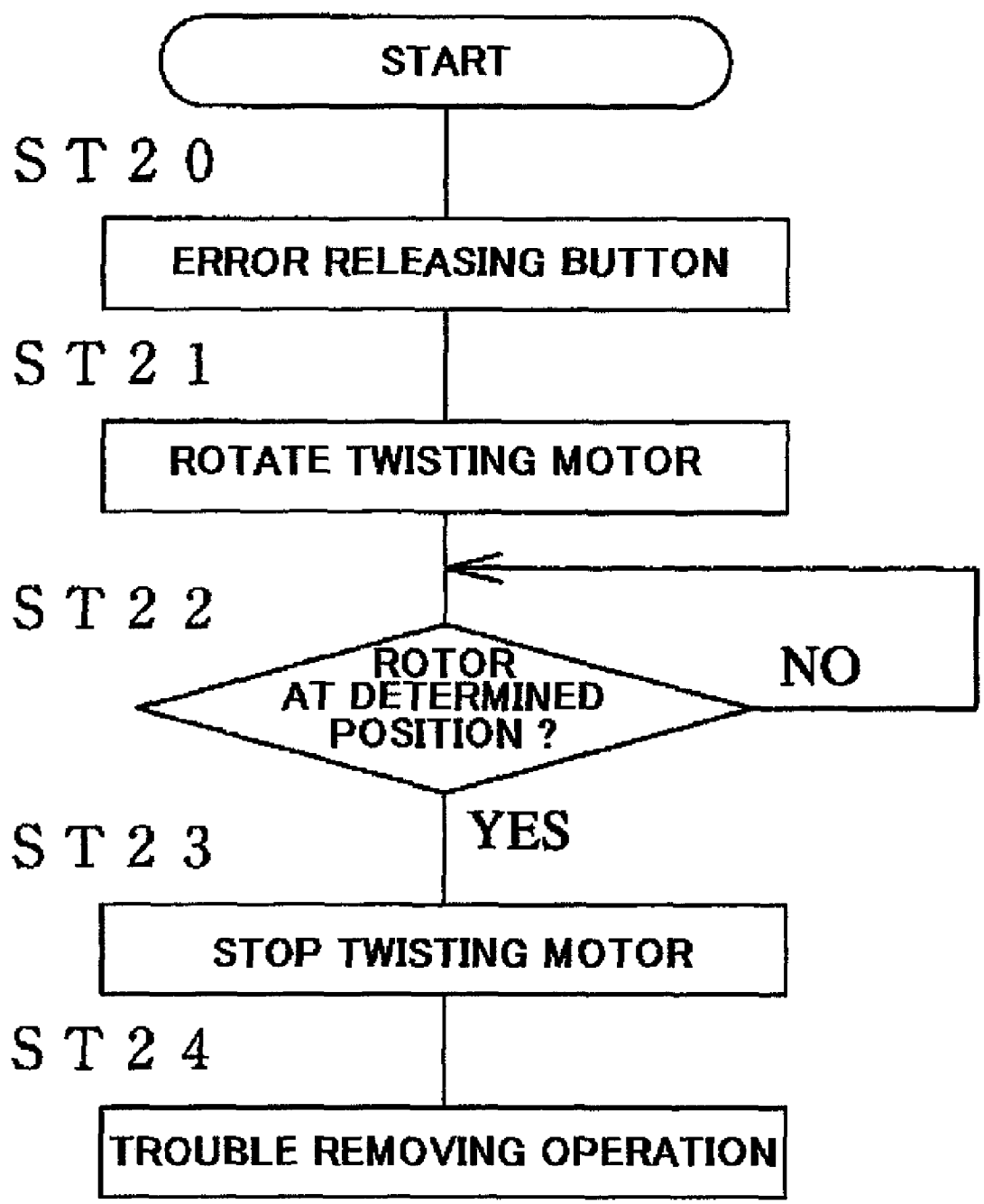
FIG. 8 is a flow chart for explaining recovery of the reinforcing bar binding machine, when a trouble has happened.

Since the position of the rotor has been detected by the sensors, the rotation position of the rotor can be judged from the results of the detection by the sensors. By judging the rotation position of the rotor, it is possible to judge the rotation position of the hook. Therefore, as shown in the flow chart in FIG. 8, for example, when an error has occurred, an error releasing button (not shown) is pressed (Step ST20). Then, the rotor is rotated (Step ST21), and when it is judged from a combination of the sensors H1, H2, H3 that the rotor has been rotated up to a determined position (releasing position) (Step ST22), the motor is stopped in Step ST23. Accordingly, it is possible to stop the hook at the position where the wire can be removed, without rotating the hook by hand, and an operation for removing the trouble can be easily conducted in Step ST24.

The control part 20 controls the gates of the inverter 21 thereby to control the normal and reverse rotations of the rotor, and at the same time, controls magnitude of the electric current flowing into the motor. Generally, when the motor is driven and the rotation is switched, a large intrusive current flows, and the motor will be heated with a flow of this intrusive current. The control part 20 monitors and controls the intrusive current for the purpose of depressing this heat.

Figure 9:
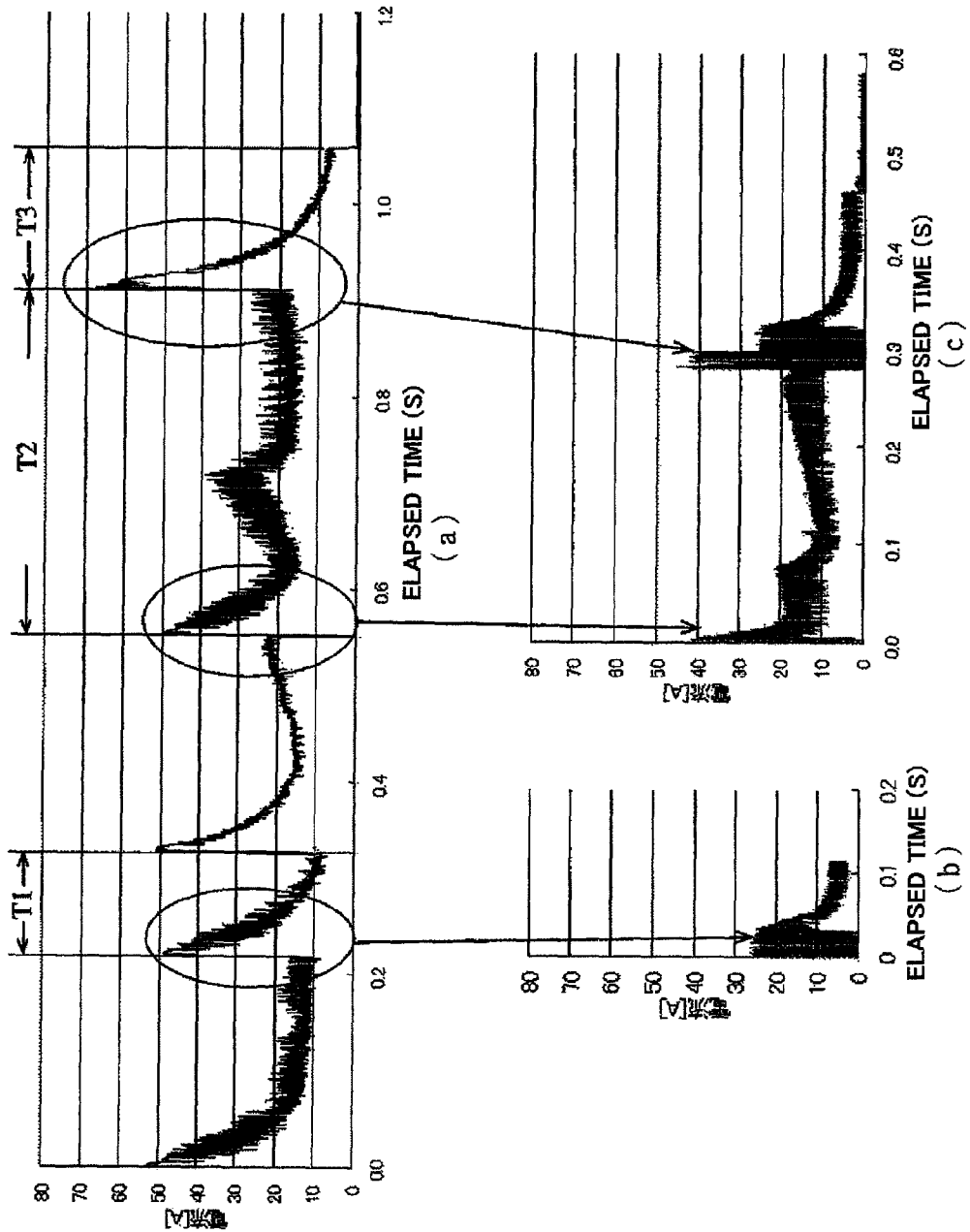
FIG. 9 is a view for explaining changes of electric current flowing to the motor of the reinforcing bar binding machine and the electric current after controlled.

(a) of FIG. 9, shows an electric current flowing to the twisting motor 4 in the conventional binding machine. T1 is a time period in which the sleeve 5 is moved forward by rotating the motor 4 in the normal direction, T2 is a time period in which the wire is twisted to bind the reinforcing bars by rotating the motor 4 in the normal direction, and T3 is a time period in which the hook 6 is released from the twisted wire to retreat the sleeve 5.

In the conventional binding machine as shown in (a) of FIG. 9, a large intrusive current flows at the beginning of each the time period. However, in the exemplary embodiment of the invention, in the time period T1, a large torque is not required because only the sleeve 5 is moved forward and a load is small. Therefore, a limit value of the electric current is set to be 25 A, as shown in (b) of FIG. 9. Moreover, in the exemplary embodiment of the invention, as shown in (c) of FIG. 9, in the time period T2, the limit value is set to be 40 A, because a large torque is required for the purpose of twisting the wire to bind the reinforcing bars. In the time period T3, the limit value is set to be 40 A at a time of intrusion, because a strong braking force is required, but the limit value is converted to 25 A, because a large torque is not required after the rotation direction has been changed, thereby to attain reduction of the power to be inputted.

Figure 10:
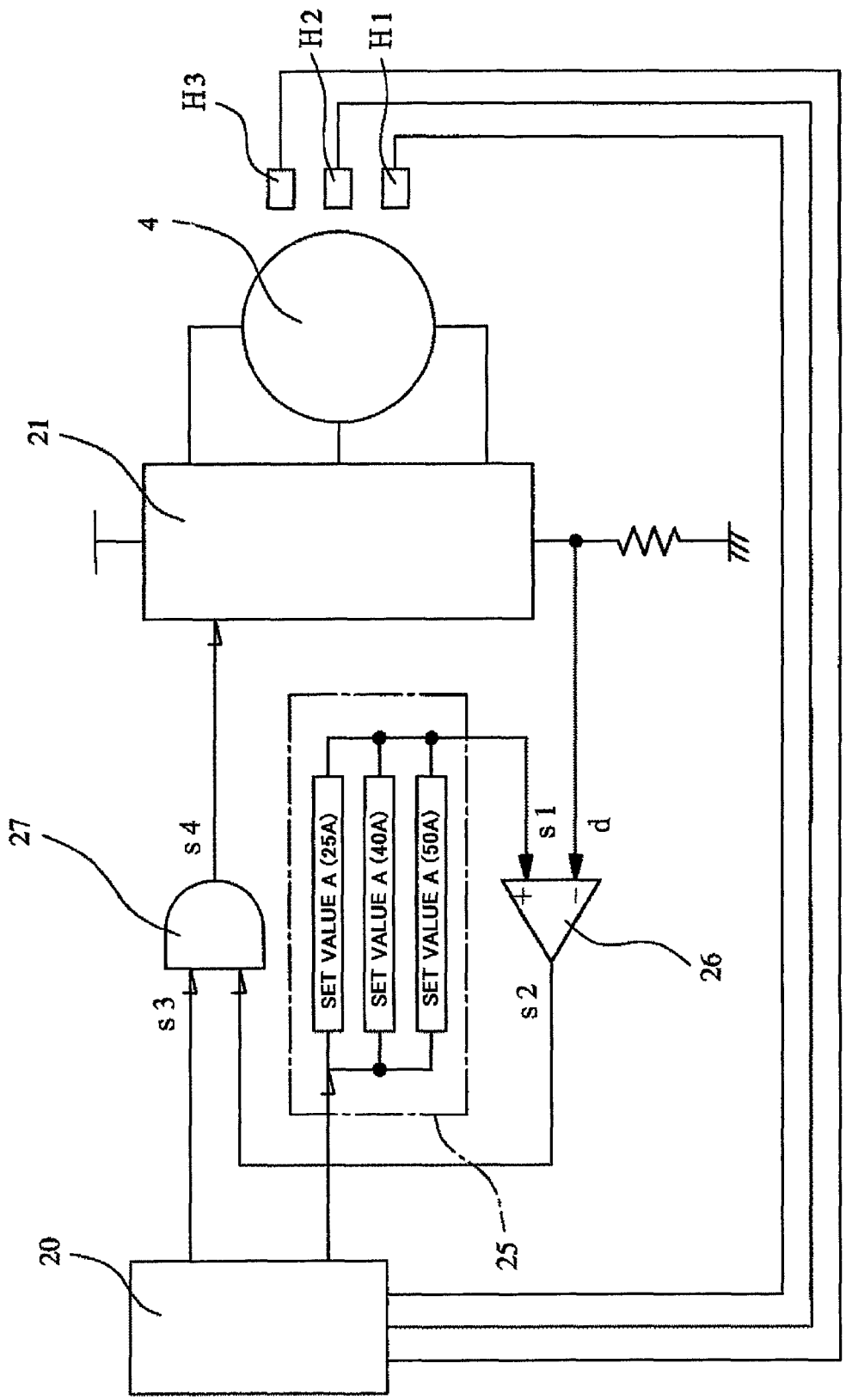
FIG. 10 is a block diagram for conducting the controls of the electric current.

As shown by a block diagram in FIG. 10, the limit values of the electric current are set in advance in a current setting part 25. The control part 20 selects a set value "s" from the current setting part 25 depending on a stage where the twisting motor 4 is, and compares an actually measured value "d" of the electric current flowing to the motor 4 with the set value "s", in a comparing circuit 26. In case where the measured value "d" exceeds the set value "s", a current restricting signal s2 becomes Lo for a short period (about several hundred us or less), and immediately thereafter, returns to Hi. While the measured value "d" exceeds the set value "s", Lo and Hi are repeated. This current restricting signal s2 is an input signal to an AND circuit 27. Accordingly, a driving signal s3 which is outputted from the control part 20 will be outputted as an inverter driving signal s4 for driving the inverter 21, only when the current restricting signal s2 is Hi. As the results, it is possible to control the electric current, by depressing the voltage inputted to the motor equivalently through time-division energization (so-called PWM control).

In the exemplary embodiment of the invention, as shown in FIG. 9, for example, in the time period T1 in which the sleeve 5 is moved forward, the driving current is limited to 25 A. In the time period T2 in which the wire is twisted, the driving current is limited to 40 A. In the time period T3 after the wire has been twisted, the driving current is limited to 40 A in the stage where the motor is rotated in the reverse direction. After the rotation direction is changed, the driving current is limited to 25 A, in the same manner as in the time period T1, because only the sleeve 5 is retreated and a large torque is not required. In this manner, the electric current to be inputted to the motor is controlled in the respective stages.

The above described limit values of the electric current can be set, for example, as resistance values of an analogue circuit in which the limit values are changed by connecting a plurality of resistors (which resistors are to be connected is determined by a microcomputer) thereby to vary a reference voltage in an analogue fashion.

Moreover, it becomes possible to predict a necessary decelerating force from the number of remaining rotations up to a target point and an allowable time, by using the present rotation number of the rotor and an integrated value thereof obtained from the detection results of the sensors. For this reason, it becomes possible to reach the target point while depressing a braking force (rush current) to the lowest limit, by adjusting the timing for starting to brake, and hence, the motor can be restrained from being heated.

As described above, the Hall sensors which are necessary for rotating the motor can be utilized not only for rotating the motor but for recognizing the state of the machine. In this manner, the position sensors for rotating the motor can be commonly used, without separately providing a detecting sensor for detecting the state of the machine, whereby detection of the position can be performed electrically, but not mechanically. Therefore, it is possible to decrease the sensors in number. As the results, the sensors need not be assembled nor adjusted, and hence, assembling performance is enhanced and the number of components is reduced. Accordingly, the electric power tool having stable and enhanced quality can be realized.

Although in the exemplary embodiment as described above, the invention has been described referring to the reinforcing bar binding machine, the invention can be applied to other electric power tools including the binding machine or the like which is controlled by rotating the motor both in the normal direction and in the reverse direction.

Although the invention has been fully described referring to specific embodiments, it is apparent to those skilled in the art that various changes and modifications can be added without deviating from the spirit and scope of the invention.

This invention is based on Japanese Patent Application which was filed on Apr. 5, 2006 (Japanese Patent Application No. 2006-104591), the contents of which are hereby incorporated by reference.

INDUSTRIAL APPLICABILITY

The invention can be applied to the electric power tool, and more particularly, to the electric power tool in which the working part is operated by rotating the motor in the normal and reverse directions.

The invention claimed is:

1. An electric power tool in which a working part is actuated by repeating rotation of a brushless motor in a normal direction and in a reverse direction one or more times, the electric tool comprising:
   at least three sensors for detecting a position of a rotor of the brushless motor, wherein
   either one or both of a rotation number and a rotation position of the motor is measured by a detection signal of one of the sensors,
   a working state of the working part is recognized from results of a measurement,
   the sensors are disposed at positions advanced by an electrical angle of $30°\pm\theta°$ from an intermediate position between respective stator teeth,
   a control part for controlling the rotation of the motor controls a driving signal for driving the motor based on detection results of the position of the rotor by the sensors, and
   the control part selects a detection signal of the sensors so that a relation between the rotor and the detection signal of the sensors is equivalent in either of the normal rotation and the reverse rotation of the rotor.

2. The electric power tool according to claim 1, wherein the electric power tool comprises restricting means for restricting electric current for driving the motor, and the restricting means controls the electric current so that the electric current is restricted to limited current values of at least two stages.

* * * * *